(12) United States Patent
Pranckun

(10) Patent No.: US 11,330,930 B2
(45) Date of Patent: May 17, 2022

(54) COFFEE OR TEA FILTERING DEVICE

(71) Applicant: Joshua John Pranckun, Westminster, CO (US)

(72) Inventor: Joshua John Pranckun, Westminster, CO (US)

( * ) Notice: Subject to any disclaimer, the term of this patent is extended or adjusted under 35 U.S.C. 154(b) by 363 days.

(21) Appl. No.: 16/402,769

(22) Filed: May 3, 2019

(65) Prior Publication Data

US 2019/0335936 A1 Nov. 7, 2019

Related U.S. Application Data

(60) Provisional application No. 62/667,208, filed on May 4, 2018.

(51) Int. Cl.
*A47J 31/32* (2006.01)
*A47J 31/46* (2006.01)
*A47J 31/043* (2006.01)
*A47J 31/36* (2006.01)

(52) U.S. Cl.
CPC ............ *A47J 31/32* (2013.01); *A47J 31/043* (2013.01); *A47J 31/468* (2018.08); *A47J 31/36* (2013.01)

(58) Field of Classification Search
CPC .......... A47J 31/043; A47J 31/32; A47J 31/36; A47J 31/468
USPC ................................. 99/302 R, 292
See application file for complete search history.

(56) References Cited

U.S. PATENT DOCUMENTS

| 7,849,784 B2 | 12/2010 | Adler | |
| 7,858,135 B2 * | 12/2010 | Radosav | A47J 31/18 426/433 |
| 10,779,675 B2 * | 9/2020 | Ford | A47J 31/3652 |
| 2006/0260471 A1 * | 11/2006 | Adler | A47J 31/32 99/279 |
| 2013/0133524 A1 * | 5/2013 | Vastardis | A47J 31/4403 99/300 |

FOREIGN PATENT DOCUMENTS

| FR | 350969 A1 * | 6/1905 | ............ A47J 31/043 |
| FR | 33307 A1 * | 9/1928 | ............ A47J 31/043 |
| FR | 1336781 A1 * | 7/1963 | ............ A47J 31/043 |
| FR | 2155040 A1 * | 4/1973 | ............ A47J 31/043 |

* cited by examiner

*Primary Examiner* — Reginald Alexander

(57) ABSTRACT

A coffee or tea filtering device including a hollow cylinder, a basket, a cup, and a pump. The hollow cylinder may include a top end, a bottom end, and a curvate sidewall extending between the top end and bottom end. The top may be open. The bottom end may be at least partially open and include a first portion of a coupling mechanism and a retaining portion. The removable basket may be sized to be received within the top end of the hollow cylinder. The removable basket may be configured to support coffee grounds or tea leaves. The cup may releasably couple to the first portion of the coupling mechanism of the bottom end of the hollow cylinder. The pump may be configured to pump air from the cup out the opening so as to force a fluid from the hollow cylinder through the basket and into the cup.

15 Claims, 7 Drawing Sheets

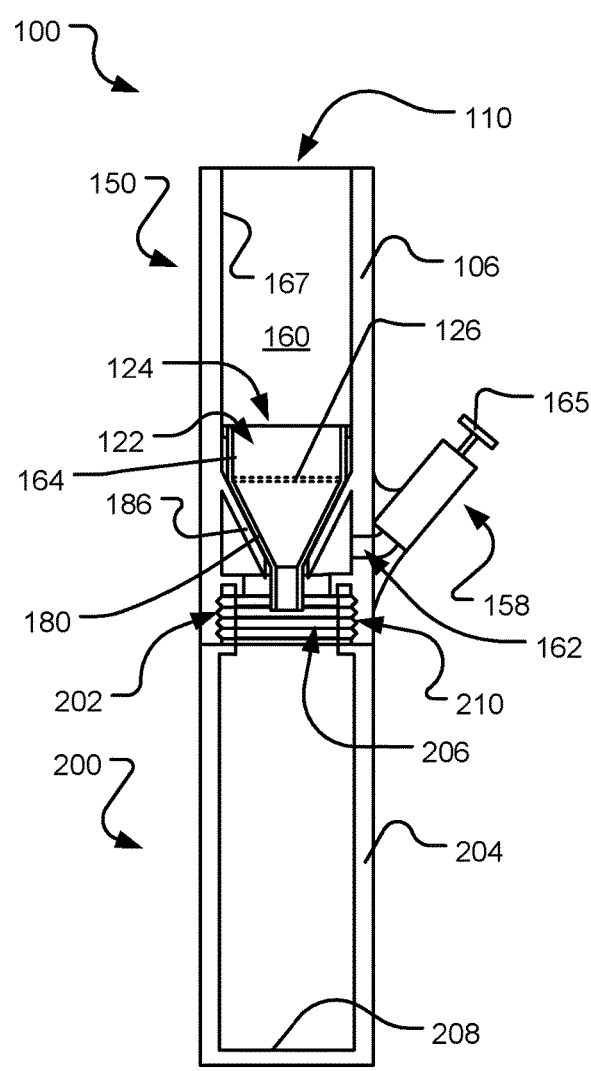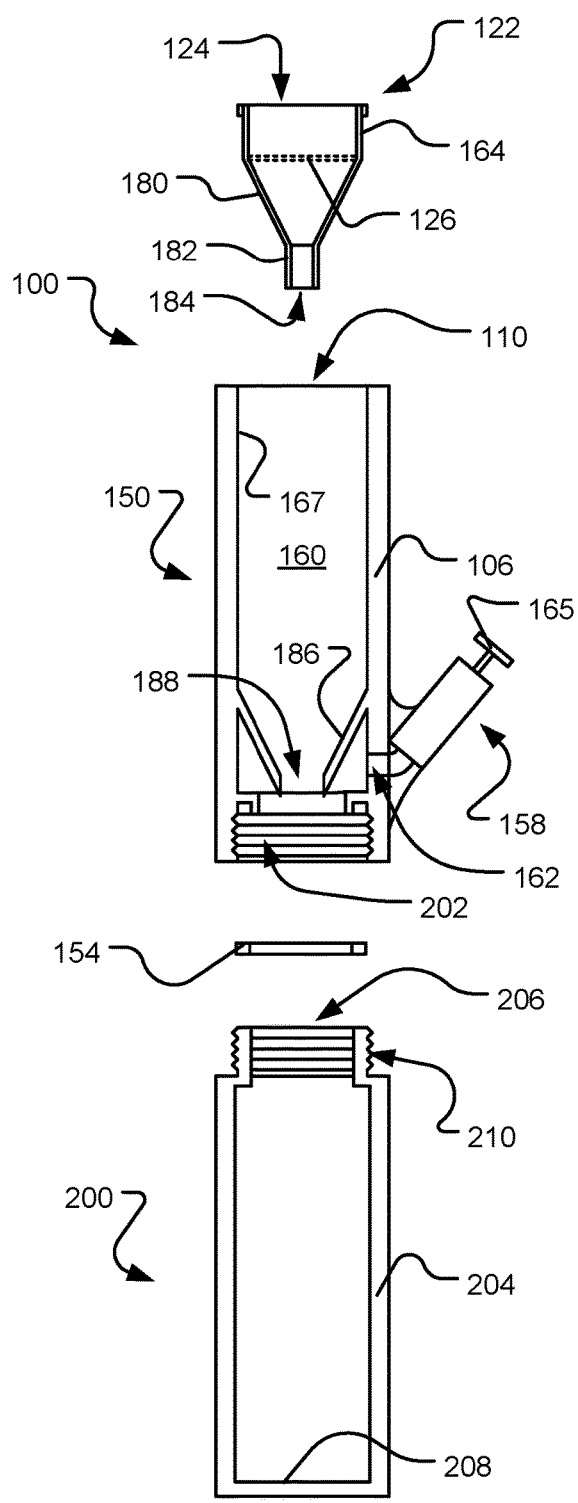
FIG. 4A
FIG. 4B

COFFEE OR TEA FILTERING DEVICE

CROSS-REFERENCE TO RELATED APPLICATIONS

This application claims the benefit of U.S. Provisional Application No. 62/667,208, filed May 4, 2018, which is hereby incorporated by reference in its entirety into the present application.

TECHNICAL FIELD

The present disclosure relates to coffee and tea filtering devices, and, more particularly, to coffee and tea filtering devices utilizing pressurized filtering where the mixture of water and coffee grounds or tea leaves is open to the ambient air during pressurized filtering.

BACKGROUND

Conventional coffee and tea filtering devices that use pressure to force fluid (e.g., water) through coffee grounds or tea leaves often require the fluid and coffee grounds or tea leaves to be in a sealed environment during the application of pressure. That is, the fluid and coffee grounds or tea leaves are not open to the ambient air during the pressurized filtering process.

In the case of espresso, coffee grounds are tamped or compacted into a basket of a portafilter, and the portafilter is sealed to a group head of an espresso machine. Once the portafilter is sealed to the group head and brewing is initiated, the coffee grounds are sealed within the group head and, thus, inaccessible. In the case of an AEROPRESS® coffee maker, coffee grounds are mixed with fluid in a cylinder, and a piston is fitted within the cylinder and forced downward to force the fluid through the coffee grounds and a filter, and into a mug. That is, the coffee and fluid are in a sealed environment that is inaccessible during the brewing and filtering process.

In certain instances, it may be advantageous to assist in the brewing process (i.e., mixing of the coffee grounds/tea leaves and water) during the application of pressure to the filtering process such as, for example, by stirring the fluid and coffee grounds or tea leaves. Stirring, or other actions, are simply not possible in pressurized filtering applications where the fluid and coffee grounds or tea leaves are in a sealed environment.

Accordingly, there is a need in the art for coffee and tea filtering devices that address the shortcomings of the devices in the art.

SUMMARY

Aspects of the present disclosure may include a coffee or tea filtering device including a hollow cylinder, a basket, a cup, and a pump. The hollow cylinder may include a top end, a bottom end, and a curvate sidewall extending between the top end and bottom end. The top may be open. The bottom end may be at least partially open and include a first portion of a coupling mechanism and a retaining portion. The removable basket may be sized to be received within the top end of the hollow cylinder. The removable basket may be configured to support coffee grounds or tea leaves. The cup may releasably couple to the first portion of the coupling mechanism of the bottom end of the hollow cylinder. The pump may be configured to pump air from the cup out the opening so as to force a fluid from the hollow cylinder through the basket and into the cup.

In certain instances, the pump may be mounted to the hollow cylinder. In certain instances, the pump may be an electric vacuum pump. In certain instances, the pump may be a mechanical vacuum pump.

In certain instances, the coupling mechanism provides an air-tight seal between the first and second portions.

In certain instances, the first and second portions of the coupling mechanism may include complementary threads.

In certain instances, the first and second portions of the coupling mechanism may include complementary portions of a twist-lock cylindrical enclosure lock.

In certain instances, the opening in the curvate sidewall of the hollow cylinder may be positioned between the first portion of the coupling mechanism and the retaining portion.

In certain instances, the pump may be releasably coupled to the hollow cylinder.

In certain instances, the device further may include a gasket supported at or near the bottom end of the hollow cylinder, the top end of the cup configured to contact the gasket when the first and second portions of the releasably couple.

Aspects of the present disclosure may include a coffee or tea filtering device may include a hollow cylinder, a basket, a cup, and a pump. The hollow cylinder may include a first opening at a first end, a second opening at a second end, and a sidewall extending between the first and second ends and having a side opening extending therethrough. The basket may be for receiving coffee grounds or tea leaves, the basket sized to fit within the first opening and slide to the second opening without fully passing the second opening. The cup may be releasably coupled with the second end of the hollow cylinder so as to form a hermetic seal therebetween. And the pump may be in fluid communication with the side opening of the hollow cylinder, the pump configured to pump air from the cup out through the opening of the hollow cylinder so as to draw fluid from the hollow cylinder through the basket and into the cup.

Aspects of the present disclosure may include a coffee or tea filtering device may include a hollow cylinder, a gasket, a basket, and a pump. The hollow cylinder may include a first opening at a first end, a second opening at a second end, and a sidewall extending between the first and second ends and having a side opening extending therethrough. The gasket may be supported at the second end of the hollow cylinder and positioned outward of the second opening, the gasket configured to abut an upper rim of a mug so as to hermetically seal the upper rim of the mug and the second end of the hollow cylinder. The basket may be for receiving coffee grounds or tea leaves, the basket sized to fit within the first opening and slide towards the second opening without passing through the second opening. And the pump may be in fluid communication with the side opening of the hollow cylinder, the pump configured to pump air from the mug out through the opening of the hollow cylinder so as to draw fluid from the hollow cylinder through the basket and into the mug.

In certain instances, the pump may be rigidly coupled to the hollow cylinder.

In certain instances, the pump may be releasably coupled to the hollow cylinder.

In certain instances, further may include a paper filter configured to fit within the basket.

In certain instances, the hollow cylinder further may include a retaining portion configured to prevent the basket from passing through the second opening.

In certain instances, the retaining portion may include a decreased inner diameter portion of the hollow cylinder.

In certain instances, the basket may include an upper lip configured to abut an upper portion of the retaining portion when the basket may be fully slid towards the second end of the hollow cylinder.

In certain instances, further may include a flange coupled to the second end of the hollow cylinder, the gasket supported by the flange.

Aspects of the present disclosure may include a coffee or tea filtering device may include a cup, a removable piston, and a basket. The cup may include a cylindrical sidewall extending a length, a bottom surface, and a top opening opposite the bottom surface. The removable piston cylinder may include a top opening at a top end, a bottom opening at a bottom end, a cylindrical sidewall extending between the top opening and the bottom opening and defining an inner cavity therein, and an top portion at the top end configured to be engaged by a user. The basket may be for receiving coffee grounds or tea leaves, the basket sized to fit within the top opening of the piston cylinder and slide towards the bottom end without passing through the bottom opening, wherein, when the basket may be positioned at the second end and when the piston cylinder may be inserted through the top opening of the cup so as to be positioned near the bottom surface, upward movement on the piston cylinder relative to the cup may be configured to force liquid from the inner cavity of the piston cylinder through the opening of the basket and into the cup.

In certain instances, the cylindrical sidewall of the cup may include a constant-diameter inner portion along at least a portion of the length.

In certain instances, the constant-diameter inner portion may be along an entirety of the length.

In certain instances, further may include a flexible seal coupled to the bottom end of the piston cylinder, the flexible seal may include an aperture therethrough.

In certain instances, the aperture of the flexible seal may be configured to coaxially align with the bottom opening of the piston cylinder when coupled thereto.

In certain instances, the basket may include a basket portion for receiving the coffee grounds or tea leaves, and a sleeve extending from the basket portion, the sleeve terminating at the bottom opening, the sleeve configured to extend through the aperture of the flexible seal when the basket is positioned at the bottom end of the piston cylinder.

In certain instances, the piston cylinder further may include a radial flange extending radially outward from the top end of thereof, the radial flange limiting displacement of the piston cylinder within the cup.

In certain instances, the cup further may include a radial flange extending radially outward from a bottom end of thereof.

In certain instances, the basket comprises a basket portion for receiving the coffee grounds or tea leaves, a sleeve extending from the basket portion, and a perforated filter portion positioned within the basket portion.

While multiple embodiments are disclosed, still other embodiments of the present disclosure will become apparent to those skilled in the art from the following detailed description, which shows and describes illustrative embodiments. As will be realized, the embodiments described herein are capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

FIG. 4A is a cross-sectional side view of a coffee or tea filtering device having a cup releasably sealed to a hollow cylinder including a pump and a basket.

FIG. 4B is an exploded, cross-sectional side view of the coffee or tea filtering device of FIG. 4A.

DETAILED DESCRIPTION

Aspects of the present disclosure may involve coffee and tea filtering devices for pressurized filtering where the brewing/mixing of the coffee or tea and water is open to the ambient air during the pressurized filtering, and where the vessel for receiving the brewed coffee or tea is sealed to the device during the pressurized filtering.

Figure 1A:
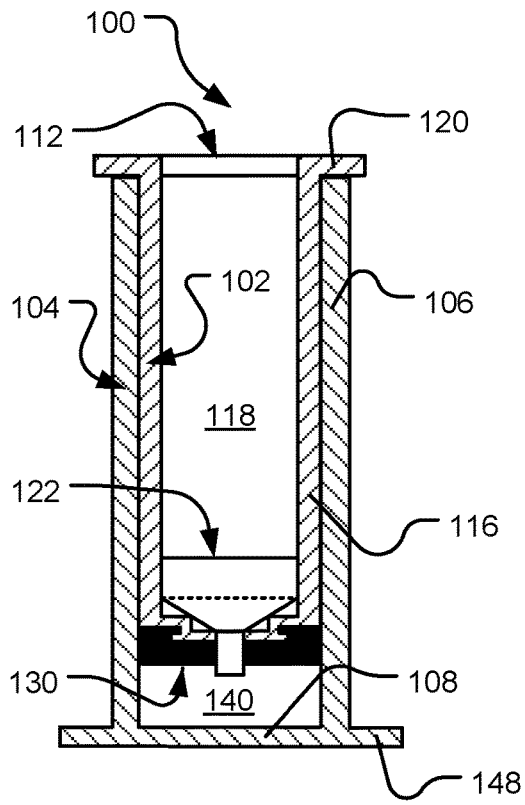
FIG. 1A is a cross-sectional side view of a coffee or tea filtering device with the piston fully inserted into the cup.

FIG. 1A is a cross-sectional side view of a coffee or tea filtering device 100 with a piston cylinder 102 fully inserted into a cup 104 of the device 100. As seen in the figure, the cup 104 includes a cylindrical sidewall 106 extending a length, a bottom surface 108, a top opening 110 opposite the bottom surface 108, and a radial flange or lip 148 extending outward from the cylindrical sidewall 106 at a bottom end of the cup 104.

The piston cylinder 102 may be removably positioned within an inner cavity of the cup 104, and includes a top opening 112 at a top end, a bottom opening 114 at a bottom end, a cylindrical sidewall 116 extending between the top opening 112 and the bottom opening 114. The cylindrical sidewall 116 defines an inner cavity 118 therein. A radial flange or lip 120 may be included at the top end and may be configured to be engaged by a user. The device 100 may include a basket 122 that is insertable or slidable within the inner cavity 118 of the piston cylinder 102. The basket 122 may receive coffee grounds or tea leaves therein. The basket 122 may include a top opening 124, a perforated filter portion 126, and a bottom opening 128. The basket 122 may be sized to fit within the top opening 112 of the piston cylinder 102 and slide towards the bottom end without passing through the bottom opening 114. And when the basket 122 is positioned at the bottom end, and when the piston cylinder 102 is inserted through the top opening 110 of the cup 104 so as to be positioned near the bottom surface 108, upward pressure via the user on the piston cylinder 102 is configured to force fluid from the inner cavity 118 of the piston cylinder 102 through the bottom opening 128 of the basket 122 and into the cup 104.

Figure 1B:
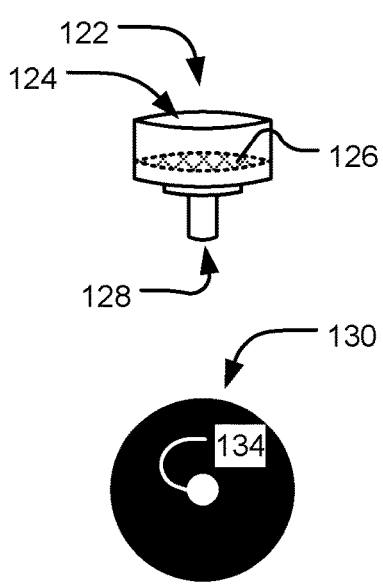
FIG. 1B is a perspective view of the basket and a bottom view of the seal.
Figure 1C:
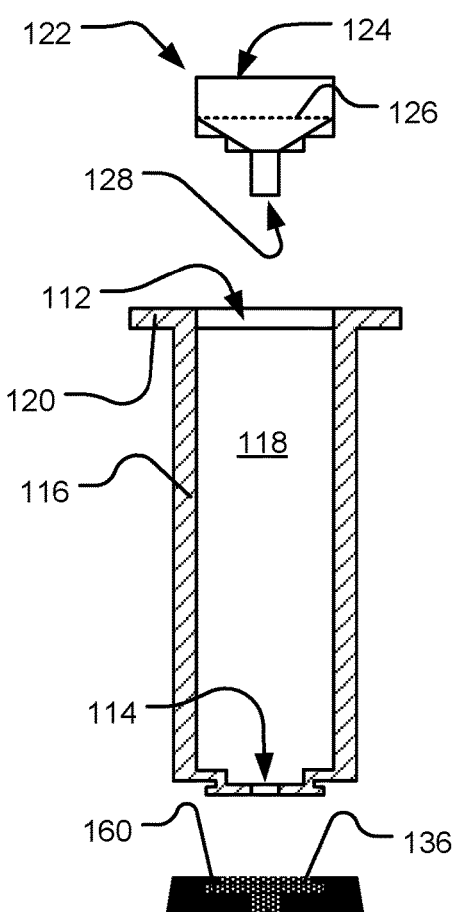
FIG. 1C is an exploded, cross-sectional view of the coffee or tea filtering device of FIG. 1A.
Figure 1C:
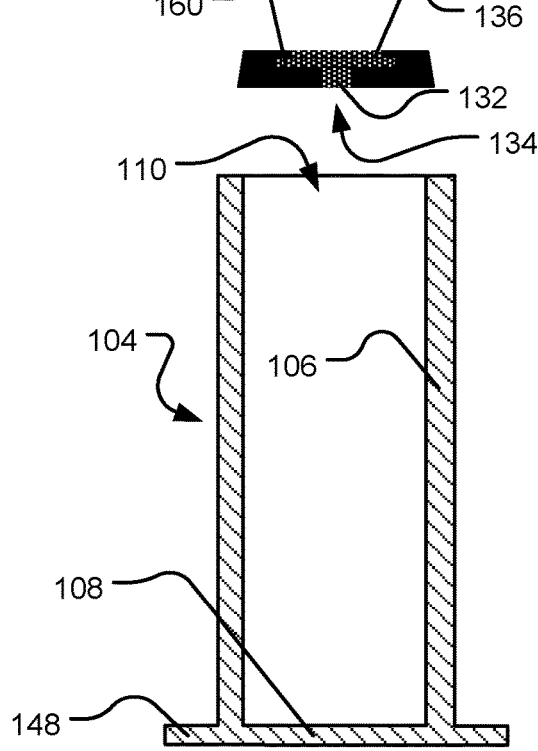

FIG. 1B is a perspective view of the basket 122 and a bottom view of the seal 130. As seen in FIGS. 1A-1C, the basket 122 includes an upper cylindrical section, an intermediate cylindrical section, and a lower cylindrical section. The perforated filter portion or element 126 may support coffee grounds or tea leaves, and prevent the coffee or tea from passing therethrough while permitting fluid to pass therethrough. A disposable paper filter may be positioned in the basket, in certain instances.

The seal 130 in FIG. 1B may generally cylindrical in shape and include a through-bore 134 through the seal 130. As particularly seen in FIG. 1C, which is an exploded, cross-sectional view of the coffee or tea filtering device of FIG. 1A, the through-bore 134 may include a lower through-bore portion 132, an intermediate through-bore portion 160, and an upper through-bore portion 136, wherein a diameter of the lower through-bore portion 132 is the smallest, and the intermediate through-bore portion 160 is the largest so as to facilitate the seal 130 releasably coupling to the bottom end of the piston cylinder 102. As seen in FIG. 1C, the bottom end of the piston cylinder 102 includes a radial flange or lip 138 that is generally a mirror image of the shape of the upper through-bore portion 136 and the intermediate through-bore portion 160 of the cylindrical through-bore 134 of the seal 130.

As seen in FIG. 1C, the bottom opening 114 at the bottom end of the piston cylinder 102 is generally similarly sized and coaxially aligned with the bottom through-bore 134 of the seal 130 when the seal 130 is coupled to the radial flange or lip 138 of the piston cylinder 102.

The cylindrical sidewall 116 of the piston cylinder 102 may include an outer diameter that is slightly less than an inner diameter of the cylindrical sidewall 106 of the cup 104 so as to permit the piston cylinder 102 to be positioned therein. The outer diameter of the seal 130 is slightly larger than the inner diameter of the cylindrical sidewall 106 of the cup 104, but it is deformable so as to provide a fluid seal with the inner cavity of the cup 104.

As seen in FIG. 1A, when the piston cylinder 102 is positioned within the inner cavity of the cup 104, the radial flange or lip 120 at the top end of the piston cylinder 102 prevents the piston cylinder 102 from extending further into the cup 102. And in this position, there is a gap 140 between the seal 130 and the bottom surface 108 of the cup 104. This gap 140 permits a certain amount of fluid to drip through the basket 122 and into the cup 104 prior to the piston cylinder 102 being pulled upwards relative to the cup 104 so as to force the fluid through the coffee grounds or tea leaves through the basket 122 and into the cup 104.

As seen in FIG. 1A, the lower cylindrical section of the basket 122 is sized to fit through the bores of the seal 130 and extend past the seal 130. In certain instances, the lower cylindrical section and the cylindrical through-bore 134 of the seal 130 and the lower cylindrical section of the basket 122 may form a fluid seal between each other.

Figures 1D, 1E, 1F:
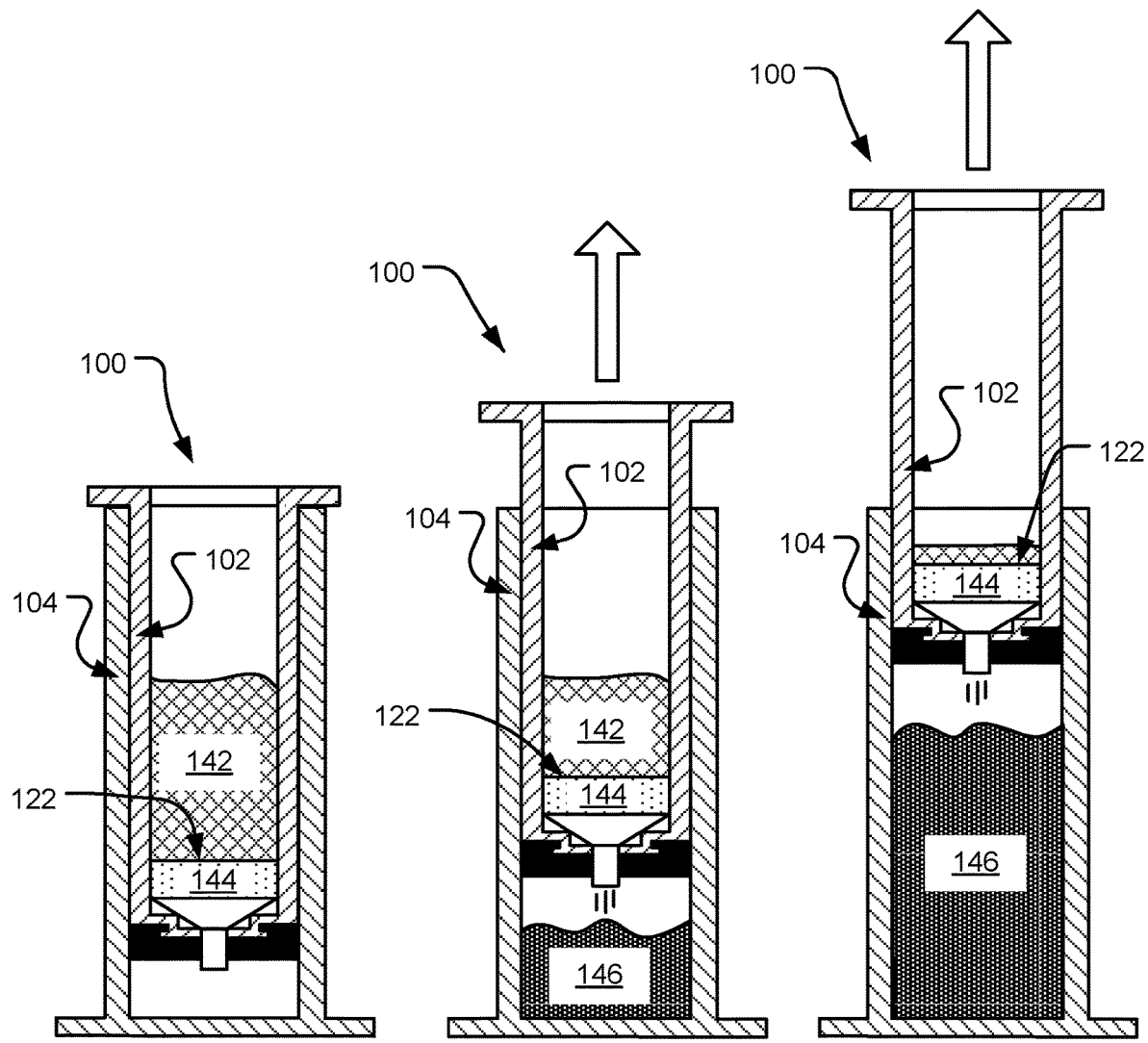
FIG. 1D is a cross-sectional side view of the coffee or tea filtering device of FIG. 1A with the basket loaded with tea or coffee, the piston loaded with fluid (e.g., water), and the piston fully inserted into the cup.
FIG. 1E is a cross-sectional side view of the coffee or tea filtering device of FIG. 1A with the basket loaded with tea or coffee, the piston loaded with fluid (e.g., water), and the piston partially pulled from its lowest position so as to force the fluid into the cup.
FIG. 1F is a cross-sectional side view of the coffee or tea filtering device of FIG. 1A with the basket loaded with tea or coffee, the piston loaded with fluid (e.g., water), and the piston nearly fully pulled from its initial position so as to force a majority of the fluid from the piston into the cup.

In this way, as seen in FIGS. 1D-1F, when the piston cylinder 102 is pulled (see arrow in FIGS. 1E and 1F) upwards relative to the cup, fluid 142 (e.g., hot water) in the inner cavity 118 of the piston cylinder 102 that is mixing or brewing with the coffee grounds or tea leaves 144 positioned in the basket 122 is forced via suction through the basket 122 and into the cup 104 to form coffee or tea 146.

FIG. 1D is a cross-sectional side view of the coffee or tea filtering device 100 of FIG. 1A with the basket 122 loaded with tea or coffee 144, the piston cylinder 102 loaded with fluid (e.g., water) 142, and the piston cylinder fully inserted into the cup 104. FIG. 1E is a cross-sectional side view of the coffee or tea filtering device 100 of FIG. 1A with the basket 122 loaded with tea or coffee 144, the piston cylinder loaded with fluid (e.g., water) 142, and the piston cylinder 102 partially moved or pulled from its lowest position so as to force the fluid 142 into the cup 104 to produce coffee or tea 146. And FIG. 1F is a cross-sectional side view of the coffee or tea filtering device 100 of FIG. 1A with the basket 122 loaded with tea or coffee 144, the piston cylinder 102 loaded with fluid (e.g., water) 142, and the piston cylinder 102 nearly fully pulled from its initial position so as to force a majority of the fluid 142 from the piston cylinder 102 into the cup 104 so as to produce coffee or tea 146.

Stated another way, the piston cylinder 102 may initially house the fluid 142, and upward movement of the piston cylinder 102 within the cup 104 may cause the fluid to transfer to the cup 104 through an opening or passage way (e.g., opening of the basket 122). The upward movement of the piston cylinder 102 may be intermittent so as to permit a longer brew time. The piston cylinder 102 may also be forced downward relative to the cup 104 during the brewing process shown in FIGS. 1D-1F so as to permit further upward movement of the piston cylinder 102 relative to the cup 104 for further transferring of fluid from the piston cylinder 102 to the cup 104.

In certain instances, instead of the basket 122 being slidable within the piston cylinder 102, the basket 122 may couple to the bottom end of the piston cylinder 102. In such an instance, the opening 114 may be larger than shown in the figures. And in such an instance, the seal 130 may couple to the basket 122 as opposed to coupling to the piston cylinder 102. In this way, the basket 122 may be removably coupled between the lower end of the piston cylinder 102 and the seal 130.

Figure 1G:
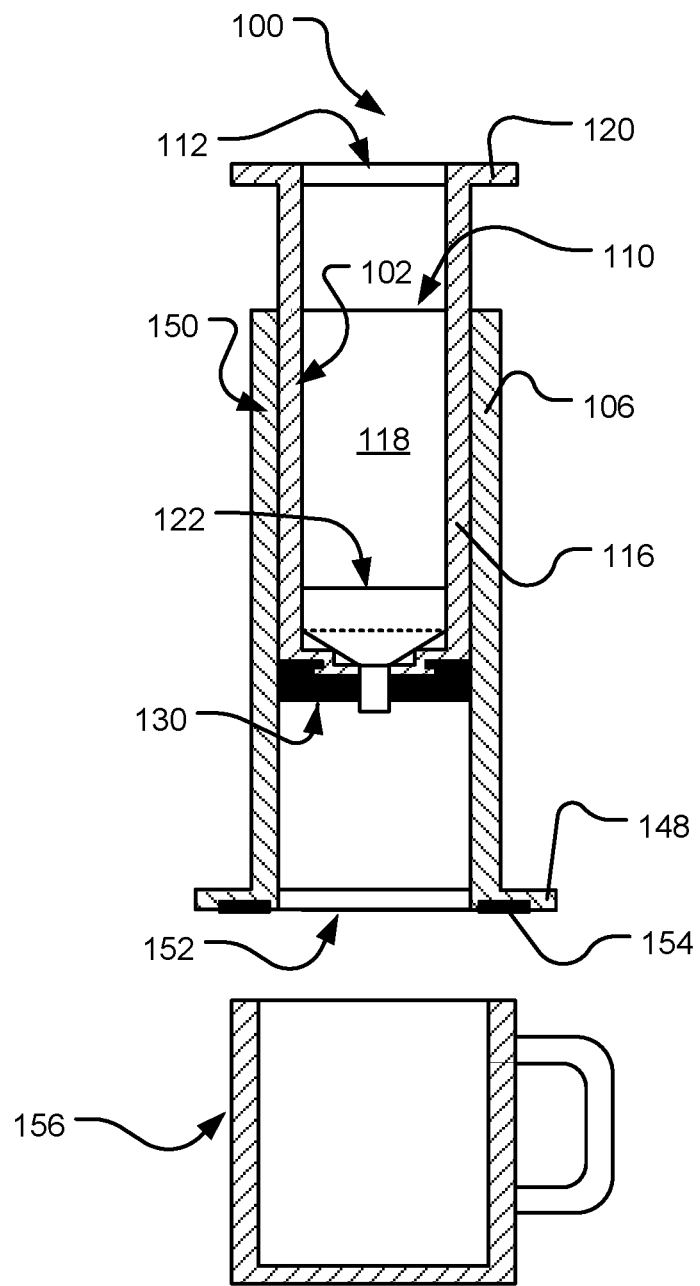
FIG. 1G is a cross-sectional side view of a coffee or tea filtering device with a piston, hollow cylinder, and a basket fitting within the piston.

FIG. 1G is a cross-sectional side view of a coffee or tea filtering device 100 with a piston cylinder 102, and a basket 122 as described with reference to FIGS. 1A-1F. The coffee or tea filtering device 100 of FIG. 1G differs from the device 100 in FIGS. 1A-1F in that it includes a hollow cylinder 150 instead of a cup 104. The hollow cylinder 150 includes a cylindrical sidewall 106 extending a length, a top opening 110, a bottom opening 152 opposite the top opening 110, and a radial flange or lip 148 extending outward from the cylindrical sidewall 106 at a bottom end of the hollow cylinder 150. The device 100 also includes a gasket 154 coupled to the radial flange 148 and configured for providing a fluid seal between the hollow cylinder 150 and a rim of a cup or mug 156. Thus, the device 100 functions the same as described previously, except that in order to force the fluid from within the inner cavity of the piston cylinder 102 to the mug 156, the gasket 154 must be positioned against the rim of the mug 156 while the piston cylinder 102 is pulled upwards relative to the hollow cylinder 150.

Figure 2A:
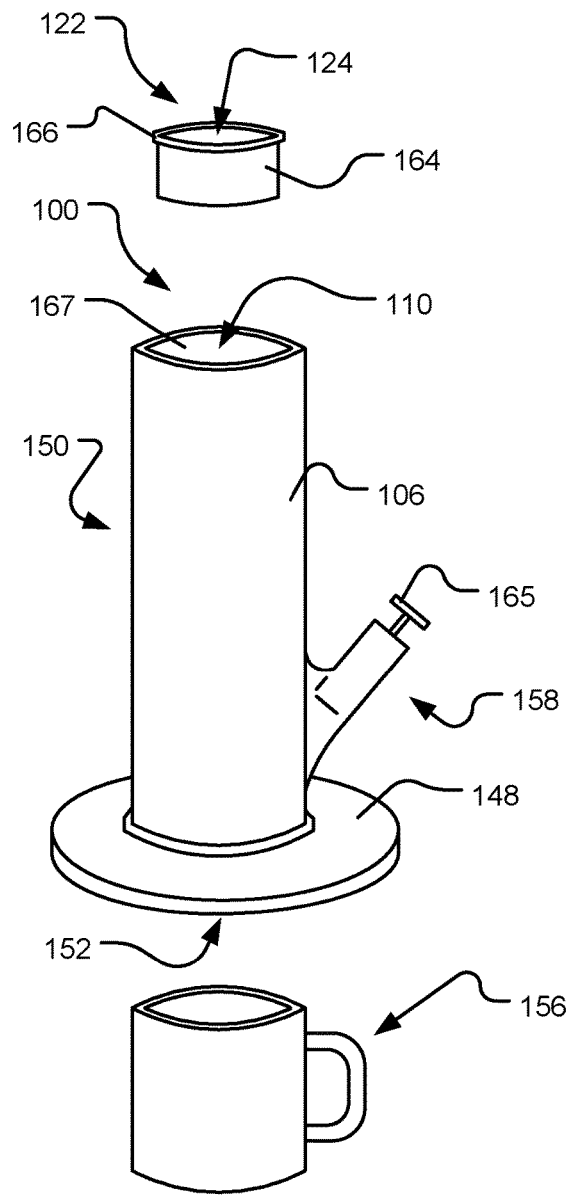
FIG. 2A is a perspective view of a coffee or tea filtering device having a hollow cylinder, a basket, a pump, and a gasket.
Figure 2C:
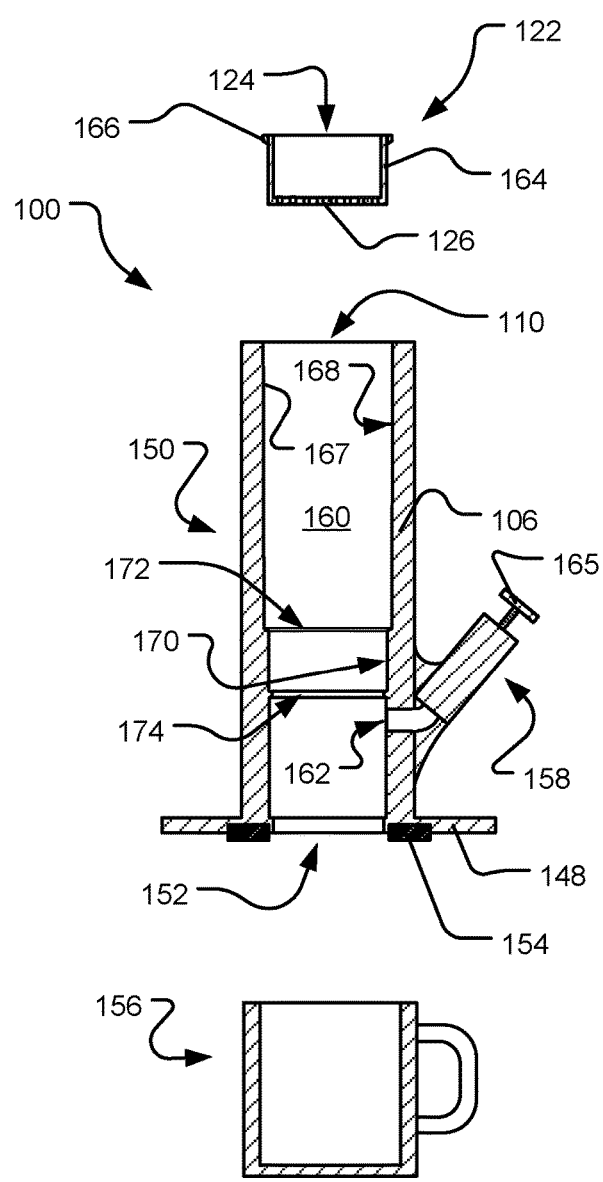
FIG. 2C is a cross-sectional side view of the coffee or tea filtering device of FIG. 2A.
Figure 2B:
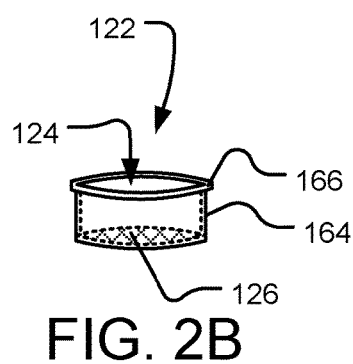
FIG. 2B is a perspective view of the basket with the inner portions shown in broken lines.

FIG. 2A is a perspective view of a coffee or tea filtering device 100 having a hollow cylinder 150, a basket 122, a pump 158, and a gasket 154. FIG. 2B is a perspective view of the basket 122 with a perforated bottom surface 126 shown in broken lines. FIG. 2C is a cross-sectional side view of the coffee or tea filtering device 100, and a mug 156 of FIG. 2A.

As seen in FIG. 2C, the hollow cylinder 150 includes a top opening 110, a bottom opening 152 opposite the top opening 110, and a cylindrical sidewall 106 extending between the bottom opening 152 and the top opening 110. The pump 158 is in fluid connection with an internal cavity 160 of the hollow cylinder 150 through an opening 162 in the sidewall 106 of the hollow cylinder 150. The pump 158 may pump air out of the inner cavity 160 when the handle 165 of the pump 158 is actuated (i.e., pulling and pushing). And when the hollow cylinder 150 is engaged with the mug 156 via the gasket 154 positioned against the rim of the mug 156, the pump 158 may pump air out of the mug 156 and the hollow cylinder 150.

As seen in the figures, the basket 122 may include a top opening 124, a cylindrical sidewall 164, and the perforated bottom surface 126 opposite the top opening. The basket 122 may also include a radial flange or lip 166 that juts out from and surrounds the top opening 124.

The hollow cylinder 150 may include an inner curvate surface 167 having an upper section 168 with a larger inner diameter than a lower section 170. Separating the upper and lower sections 168, 170 may be an incut section 172 configured to abut the radial flange 166 when the basket 122 is slid down the inner cavity 160 of the hollow cylinder. That is, the incut section 172 may prevent the basket 122 from sliding further down the hollow cylinder 150 by the interaction of the incut section 172 and the radial flange 166. The inner curvate surface 162 may additionally include an inwardly extending protrusion 174 that abuts the outer edge of the perforated bottom surface 126 of the basket 122.

The gasket 154 is coupled to a radial flange or lip 148 extending outwardly from the bottom end of the hollow cylinder 150. The gasket 154 is sized to fit a range of sizes of mugs 156. For example, conventional mugs have a rim diameter of about 3¼ inch. In certain instances, the gasket 154 may be an inch wide with an inner diameter of 2¼ inch and an outer diameter of 4¼ inch.

As seen in FIG. 2C, the opening 162 in the sidewall 106 of the hollow cylinder 150 is positioned between the perforated bottom surface 126 of the basket 122 (when positioned in the hollow cylinder 150) and the bottom opening 152 of the hollow cylinder 150. That way, when the hollow cylinder 150 is positioned against a mug 156 such that the gasket 154 is hermetically sealed against the rim of the mug 156, and when the basket 122 is positioned in the hollow cylinder 150 such that the radial flange 166 of the basket 122 abuts the incut section 172 of the hollow cylinder 150, actuation of the pump 158 may cause air from within the mug 156 to be sucked or forced out the opening 162, which causes fluid to be filtered through coffee grounds or tea leaves within the basket 122, and through the bottom opening 152, so as to deposit coffee or tea, respectively, within the mug 156.

Figures 3A, 3B:
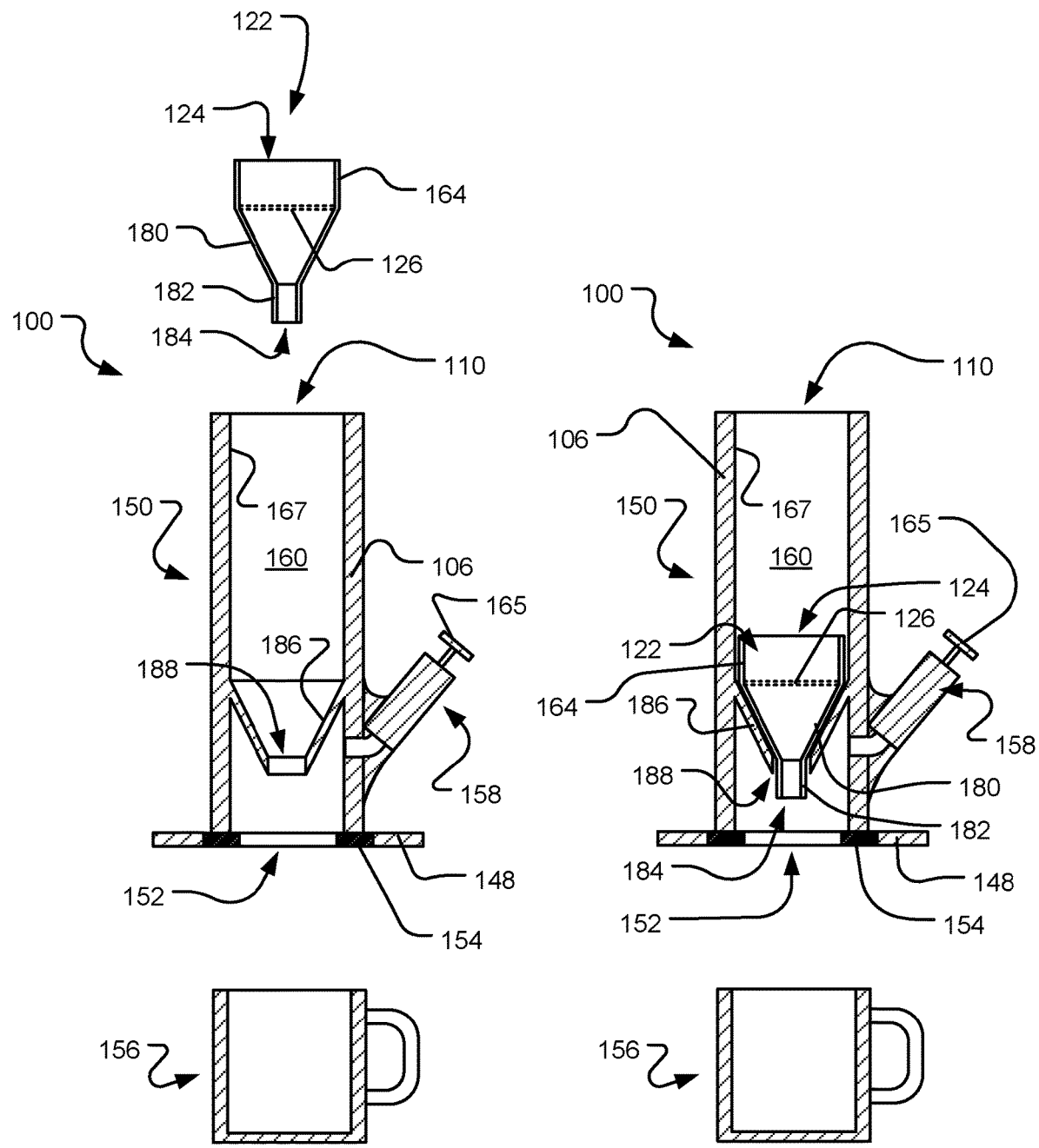
FIG. 3A is a perspective view of a coffee or tea filtering device having a hollow cylinder, a basket, a pump, and a gasket.
FIG. 3B is a perspective view of a coffee or tea filtering device having a hollow cylinder, a basket, a pump, and a gasket where the basket is inside the hollow cylinder.

FIG. 3A is a perspective view of a coffee or tea filtering device 100 having a hollow cylinder 150, a basket 122, a pump 158, and a gasket 154 where the basket 122 is outside the hollow cylinder 150. FIG. 3B is a perspective view of a coffee or tea filtering device 100 having a hollow cylinder 150, a basket 122, a pump 158, and a gasket 154 where the basket 122 is inside the hollow cylinder 150. The device 100 of FIGS. 3A and 3B includes many of the same features and components from the device 100 of FIGS. 2A-2C, except the basket 122 is shaped differently and the internal side of the hollow cylinder 150 is also shaped differently to accommodate the basket 122. As seen in FIGS. 3A and 3B, the basket 122 may include a top opening 124, a cylindrical sidewall 164, and the perforated surface 126 opposite the top opening 124 that supports the coffee or tea leaves. The basket 122 may also include a lower conical surface 180 that acts as a funnel, and that extends inward from the cylindrical sidewall 164. The lower conical surface 180 may transition to a lower cylindrical surface 182, which then transitions to a lower opening 184. As fluid is filtered through the coffee grounds or tea leaves positioned in the basket 122, the fluid funnels through the perforated surface 126 and is funneled inward via the lower conical surface 180, and out of the basket 122 through the lower opening 184.

The inner curvate surface 167 of the hollow cylinder 150 may include a conical surface 186 that extends inward and that terminates in an opening 188. The conical surface 186 may abut the lower conical surface 180 of the basket 122 when the basket 122 is positioned within the inner cavity 160 of the hollow cylinder 150. When the basket 122 is positioned in the inner cavity 160 of the hollow cylinder 150 such that the conical surface 186 abuts the lower conical surface 180 of the basket, the lower cylindrical surface 182 may extend through the lower opening 184.

In certain instances, there may be a seal (not shown in FIG. 3A or 3B) positioned between the basket 122 and the hollow cylinder 150. In certain instances, the seal may be positioned between the conical surface 186 and the lower conical surface 180 of the basket 122. In certain instances, the seal may be positioned between the lower cylindrical surface 182 and the opening 188 of the conical surface 186. In certain instances, the seal may be positioned between the inner curvate surface 167 of the hollow cylinder 150 and the cylindrical sidewall 164 of the basket.

Having the lower cylindrical surface 182 extend through the opening 188 permits easy disassembly by a user since the lower cylindrical surface 182 may be pushed through the opening 188.

FIG. 4A is a cross-sectional side view of a coffee or tea filtering device 100 having a cup 200 releasably sealed to a hollow cylinder 150 including a pump 158 and a basket 122, where the basket 122 is positioned within the hollow cylinder 150. FIG. 4B is an exploded, cross-sectional side view of the coffee or tea filtering device 100 of FIG. 4A. The device 100 of FIGS. 4A and 4B is similar to the device 100 of FIGS. 3A and 3B, except in FIGS. 4A and 4B the hollow cylinder 150 is releasably coupled to the cup 200 via a threaded connection. That is, the basket 122 is the same as previously described, and an upper portion of the hollow cylinder 150 (from the pump 158 upward) is the same as previously described.

As seen in the figures, the hollow cylinder 150 may include a threaded lower section or a first portion of a coupling mechanism 202 that is positioned below the opening 162 in the hollow cylinder 150.

The cup 200 may include a curvate sidewall 204, an opening 206 at the top end, and a closed bottom end 208. The top end may include a threaded section or a second portion of the coupling mechanism 210 that is configured to releasably couple to the first portion of the coupling mechanism 202 of the bottom end of the hollow cylinder 150.

When the cup 200 is coupled to the hollow cylinder 150 via the first and second portions of the coupling mechanism 202, 210, actuation of the pump 158 forces air from within the cup 200 out the opening 162 so as to force fluid from within the inner cavity 160 of the hollow cylinder 150 to filter through the basket 122, and the coffee grounds or tea leaves positioned therein, to produce coffee or tea, respectively, in the cup 200.

As seen in FIG. 4A, when the cup 22 is coupled to the hollow cylinder 150, the sidewalls 204, 106 may be flush with each other.

As seen in FIGS. 4A and 4B, the coffee or tea filtering device 100 may include a seal or gasket 154 supported within a recess of the hollow cylinder 150. The seal 154 may be positioned directly above the threaded lower section 202 of the hollow cylinder 150 so the rim of the cup 200 contacts the seal 154 when it is threaded to the hollow cylinder 150.

Figure 5:
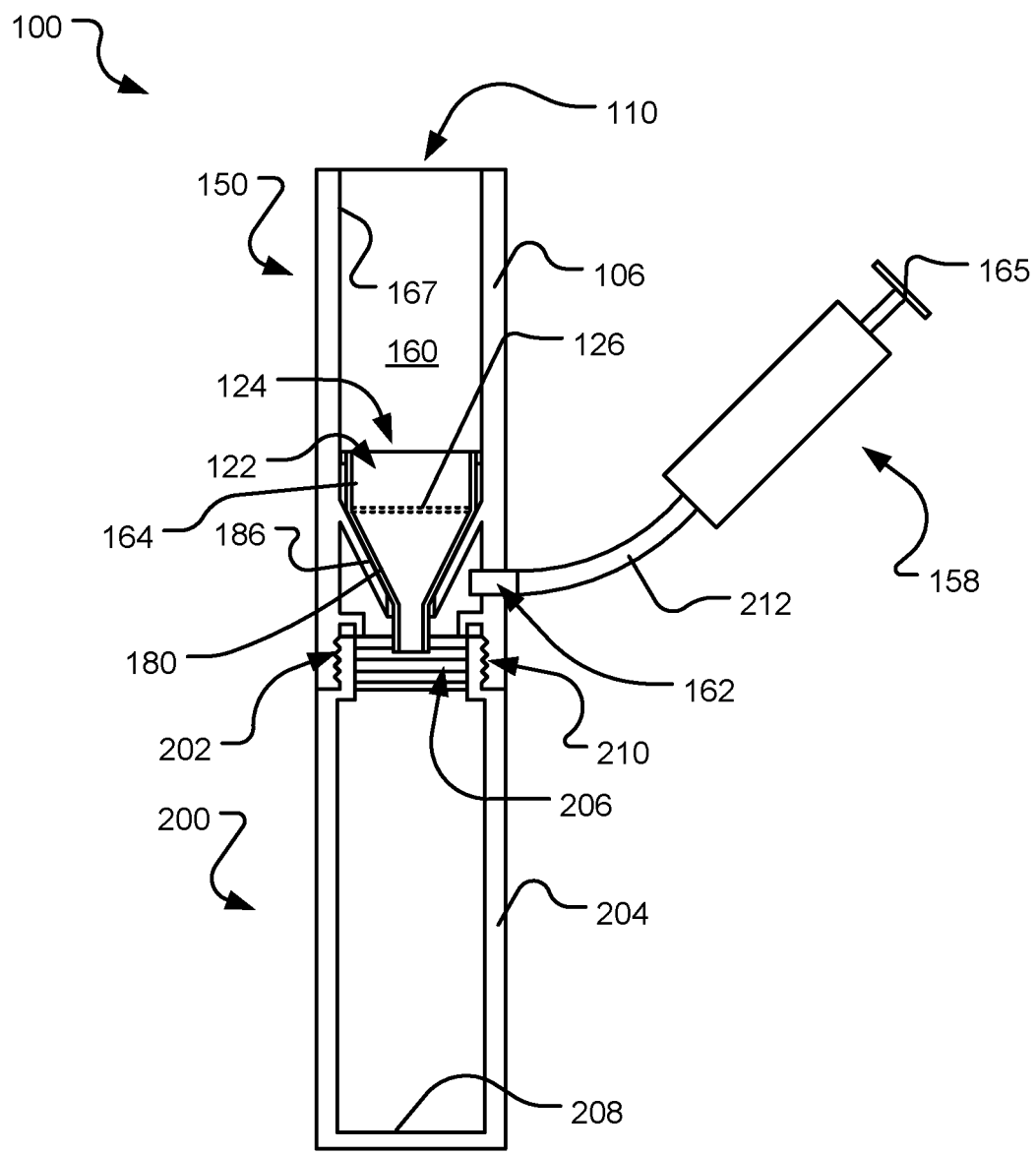
FIG. 5 is a cross-sectional side view of a coffee or tea filtering device having a cup releasably sealed to a hollow cylinder including a pump and a basket.

FIG. 5 is a cross-sectional side view of a coffee or tea filtering device 100 having a cup 200 releasably sealed to a hollow cylinder 150 including a pump 158 and a basket 122. The device 100 of FIG. 5 may include the same or similar components to the device of FIGS. 4A and 4B, except the pump 158 that is releasably coupled to the opening 162 of the hollow cylinder 150 via a flexible tube 212. Otherwise, the device 100 may function similarly to the device 100 of FIGS. 4A and 4B.

It is noted that any of the features or elements of the various coffee or tea filtering devices 100 described herein may be interchanged with features or elements shown in different instances of the device. As one example among many, the basket 122 shown in FIGS. 2A-2C may be used in place of the basket 122 in the device of FIGS. 3-5 with the appropriate modifications to the hollow cylinder 150 to accommodate the puck-shaped basket 122 of FIGS. 2A-2C, and vice versa.

In certain instances, the pump 158 may be a manual or mechanical vacuum pump. And in certain instances, the pump 158 may be an electric vacuum pump running on battery power (DC) or power from a standard outlet (AC).

The foregoing merely illustrates the principles of the coffee or tea filtering device 100. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the device and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

I claim:

1. A coffee or tea filtering device comprising:
a cup comprising first threads on an upper end thereof;
a hollow cylinder comprising a first opening at a first end, a second opening at a second end, second threads at the second end that are configured to threadably engage the first threads on the upper end of the cup, and a sidewall extending between the first and second ends and having a side opening extending therethrough;
a gasket supported at the second end of the hollow cylinder, the gasket configured to abut an upper rim of a cup so as to hermetically seal the upper rim of the cup and the second end of the hollow cylinder;
a basket for receiving coffee grounds or tea leaves, the basket sized to fit within the first opening and slide towards the second opening without passing through the second opening; and
a pump in fluid communication with the side opening of the hollow cylinder, the pump configured to pump air from the cup out through the opening of the hollow cylinder so as to draw fluid from the hollow cylinder through the basket and into the cup.

2. The coffee or tea filtering device of claim 1, wherein the pump is a mechanical vacuum pump.

3. The coffee or tea filtering device of claim 1, wherein the pump is an electric vacuum pump.

4. The coffee or tea filtering device of claim 1, wherein the hollow cylinder further comprises a retaining portion configured to prevent the basket from passing through the second opening.

5. The coffee or tea filtering device of claim 4, wherein the retaining portion comprises a decreased inner diameter portion of the hollow cylinder.

6. The coffee or tea filtering device of claim 4, wherein the basket comprises an upper lip configured to abut an upper portion of the retaining portion when the basket is fully slid towards the second end of the hollow cylinder.

7. The coffee or tea filtering device of claim 1, wherein a gasket is positioned outward of the second opening of the hollow cylinder.

8. The coffee or tea filtering device of claim 1, wherein the hollow cylinder and the cup are constructed of non-metal materials.

9. A coffee or tea filtering device comprising:
a hollow cylinder comprising a top end, a bottom end opposite the top end, and a curvate sidewall extending between the top end and bottom end, the top end being open, the bottom end being at least partially open and comprising a first portion of a coupling mechanism and a retaining portion, the curvate sidewall comprising an opening;
a removable basket comprising a curvate sidewall, an open top end, and perforated bottom end, the removable basket sized to be received within the top end of the hollow cylinder, the removable basket configured to be restrained from fully passing through the bottom end of the hollow cylinder via the retaining portion of the hollow cylinder, the removable basket configured to support coffee grounds or tea leaves;
a cup comprising a curvate sidewall, an open top end, and a closed bottom end, the open top end comprising a second portion of the coupling mechanism configured to releasably couple to the first portion of the coupling mechanism of the bottom end of the hollow cylinder, wherein the coupling mechanism provides an air-tight seal between the first and second portions, wherein the first and second portions of the coupling mechanism comprise one of: complementary threads; or complementary portions of a twist-lock cylindrical enclosure lock; and
a pump in fluid communication with the opening of the hollow cylinder, wherein the pump is configured to pump air from the cup out the opening so as to force a fluid from the hollow cylinder through the basket and into the cup.

10. The coffee or tea filtering device of claim 9, wherein the pump is mounted to the hollow cylinder.

11. The coffee or tea filtering device of claim 9, wherein the opening in the curvate sidewall of the hollow cylinder is positioned between the first portion of the coupling mechanism and the retaining portion.

12. The coffee or tea filtering device of claim 9, wherein the pump is releasably coupled to the hollow cylinder.

13. The coffee or tea filtering device of claim 9, further comprising a gasket supported at or near the bottom end of the hollow cylinder, the top end of the cup configured to contact the gasket when the first and second portions of the releasably couple.

14. The coffee or tea filtering device of claim 9, wherein the retaining portion comprises a projection extending inwardly from an inner surface of the curvate sidewall of the hollow cylinder, the removable basket configured to be restrained from fully passing through the bottom end of the hollow cylinder via contact with the projection.

15. A coffee or tea filtering device comprising:
a cup comprising first threads on an upper end thereof;
a hollow cylinder comprising a first opening at a first end, a second opening at a second end, second threads at the second end that are configured to threadably engage the first threads on the upper end of the cup, and a sidewall extending between the first and second ends and having a side opening extending therethrough, the second end of the hollow cylinder configured to form a hermetic seal with a top end of the cup;
a basket for receiving coffee grounds or tea leaves, the basket sized to fit within the first opening and slide to the second opening without fully passing the second opening; and
a pump in fluid communication with the side opening of the hollow cylinder, the pump configured to pump air from the cup out through the opening of the hollow cylinder so as to draw fluid from the hollow cylinder through the basket and into the cup.

* * * * *